(12) United States Patent
Decant

(10) Patent No.: US 9,365,024 B2
(45) Date of Patent: Jun. 14, 2016

(54) APPARATUS FOR MANUFACTURING A MULTI-AXIAL LAMINATE OF WEBS PRODUCED FROM CABLES BROKEN INTO STRIPS

(71) Applicant: FERLAM TECHNOLOGIES, Roubaix (FR)

(72) Inventor: Xavier Decant, Bondues (FR)

(73) Assignee: FERLAM TECHNOLOGIES, Roubaix (FR)

( * ) Notice: Subject to any disclaimer, the term of this patent is extended or adjusted under 35 U.S.C. 154(b) by 232 days.

(21) Appl. No.: 14/132,744

(22) Filed: Dec. 18, 2013

(65) Prior Publication Data

US 2014/0130984 A1  May 15, 2014

Related U.S. Application Data

(62) Division of application No. 13/389,638, filed as application No. PCT/FR2010/051645 on Aug. 3, 2010, now Pat. No. 8,636,866.

(30) Foreign Application Priority Data

Aug. 14, 2009 (FR) ...................................... 09 55672
Mar. 25, 2010 (FR) ...................................... 10 52148

(51) Int. Cl.
*D04H 1/498* (2012.01)
*D04H 3/105* (2012.01)
*B29C 70/14* (2006.01)
*B29C 70/22* (2006.01)
*B29C 70/38* (2006.01)
*B32B 38/00* (2006.01)
(Continued)

(52) U.S. Cl.
CPC ............. *B32B 38/0004* (2013.01); *B29C 70/14* (2013.01); *B29C 70/202* (2013.01);
(Continued)

(58) Field of Classification Search
CPC .......... D04H 1/46; D04H 1/498; D04H 3/102; D04H 3/105; D04H 13/005; B29C 70/14; B29C 70/202; B29C 70/228; B29C 70/38; B29C 70/386; B29C 70/388
See application file for complete search history.

(56) References Cited

U.S. PATENT DOCUMENTS

| | | | | |
|---|---|---|---|---|
| 4,292,108 A | * | 9/1981 | Weiss ....................... | B26D 5/04 156/259 |
| 5,117,348 A | * | 5/1992 | Romero ................ | B29C 70/388 156/350 |

(Continued)

FOREIGN PATENT DOCUMENTS

| | | |
|---|---|---|
| DE | 10252671 C1 | 12/2003 |
| EP | 972102 A1 | 1/2000 |

(Continued)

OTHER PUBLICATIONS

International Search Report for International Application No. PCT/FR2010/051645 dated Jan. 28, 2011.

*Primary Examiner* — Michael Tolin
(74) *Attorney, Agent, or Firm* — Heslin Rothenberg Farley & Mesiti P.C.

(57) ABSTRACT

Apparatus for manufacturing a multi-axial laminate of webs produced from cables stretch broken into strips includes a conveyor table, a transfer device, at the entry thereof, arranging a first layer of pre-wound pre-cut strips along the longitudinal axis of the table, the strips being partially superimposed; at least two cross lappers arranged along the table transferring and depositing in an oblique and/or divergent position at predetermined angles a stretch broken strip, and arranging the strips in successive superimpositions on the first layer of pre-cut strips in different planes, to form a multi-axial web of stretch broken strips. The web then being treated by a fixing device. Movement of the support belt of the table taking place in steps to ensure the superimposition of the different layers of pre-broken strips deposited by the cross lappers. Implementation taking place without any prior cohesion treatment of each strip.

5 Claims, 19 Drawing Sheets

(51) Int. Cl.
*B29C 70/20* (2006.01)
*D04H 1/46* (2012.01)
*D04H 3/04* (2012.01)
*D04H 3/10* (2012.01)

(52) U.S. Cl.
CPC ............... *B29C70/228* (2013.01); *D04H 1/46* (2013.01); *D04H 1/498* (2013.01); *D04H 3/04* (2013.01); *D04H 3/10* (2013.01); *D04H 3/105* (2013.01); *Y10T 156/12* (2015.01); *Y10T 156/1317* (2015.01); *Y10T 156/17* (2015.01); *Y10T 156/1744* (2015.01); *Y10T 428/24058* (2015.01); *Y10T 428/24074* (2015.01); *Y10T 428/24083* (2015.01); *Y10T 428/24091* (2015.01); *Y10T 428/24099* (2015.01); *Y10T 428/24107* (2015.01); *Y10T 428/24116* (2015.01); *Y10T 428/24124* (2015.01); *Y10T 442/667* (2015.04)

(56) References Cited

U.S. PATENT DOCUMENTS

| 6,585,842 | B1* | 7/2003 | Bompard | B29C 70/202 |
| | | | | 156/166 |
| 8,187,402 | B2 | 5/2012 | Heinrich et al. | |
| 2006/0162143 | A1* | 7/2006 | Nelson | B29C 70/207 |
| | | | | 29/431 |
| 2006/0188691 | A1* | 8/2006 | Kawabe | D04H 3/04 |
| | | | | 428/105 |
| 2008/0223505 | A1 | 9/2008 | Bompard et al. | |

FOREIGN PATENT DOCUMENTS

| EP | 1054091 A1 | 11/2000 |
| FR | 2196966 A1 | 3/1974 |
| FR | 2761380 A1 | 10/1998 |
| WO | 2007/098786 A1 | 9/2007 |

* cited by examiner

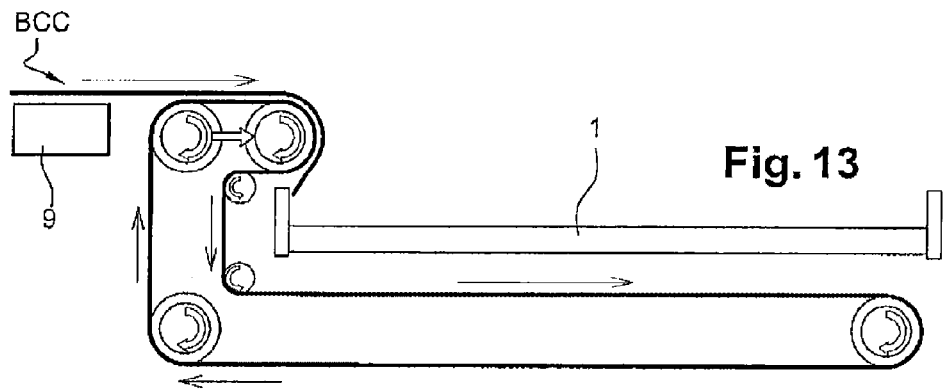
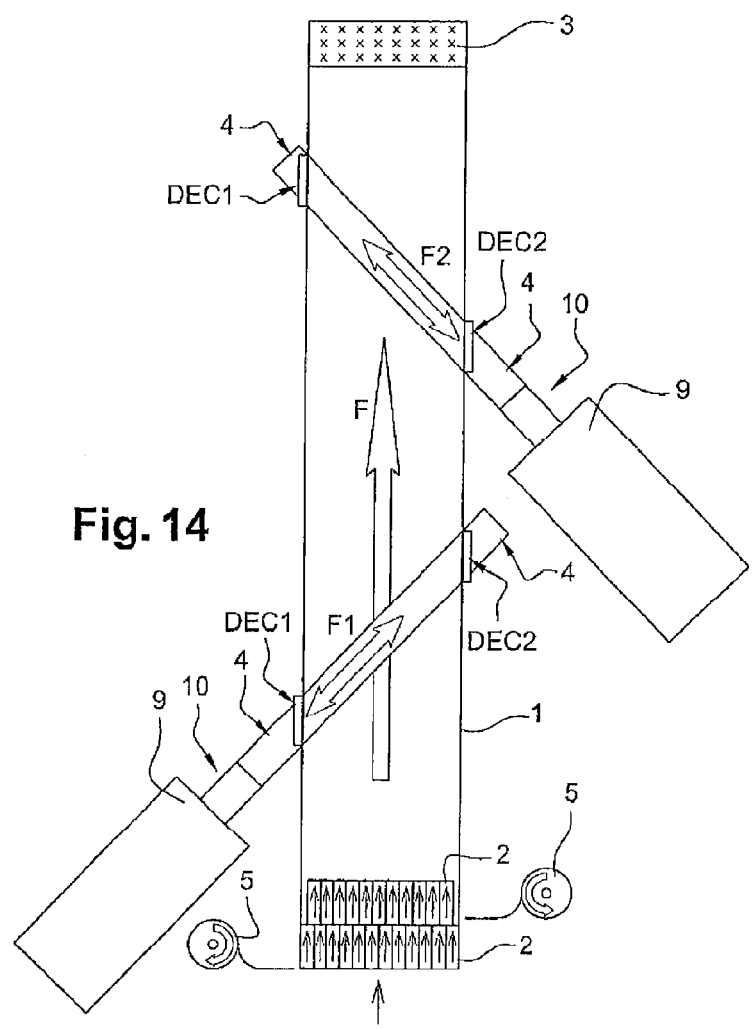

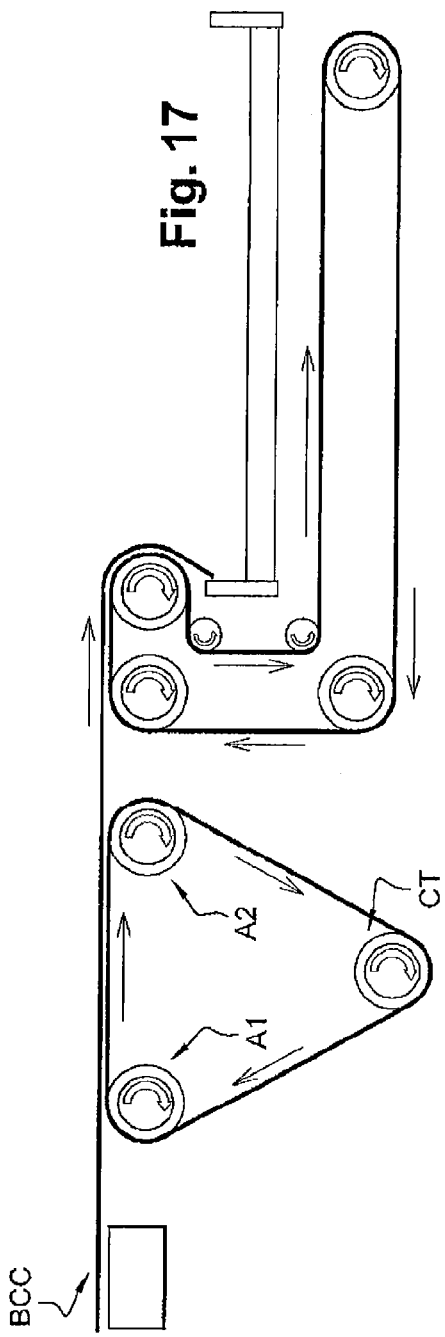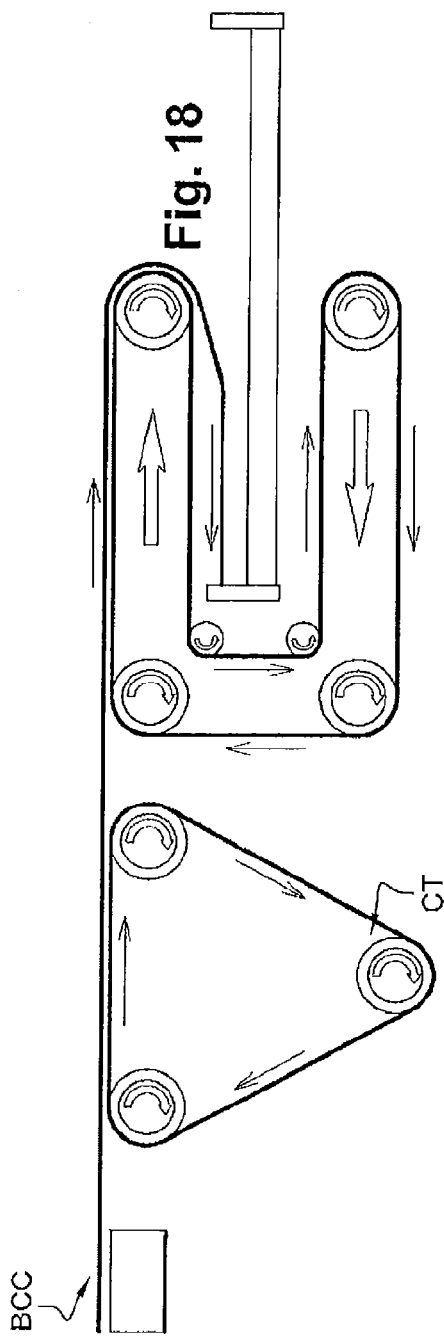

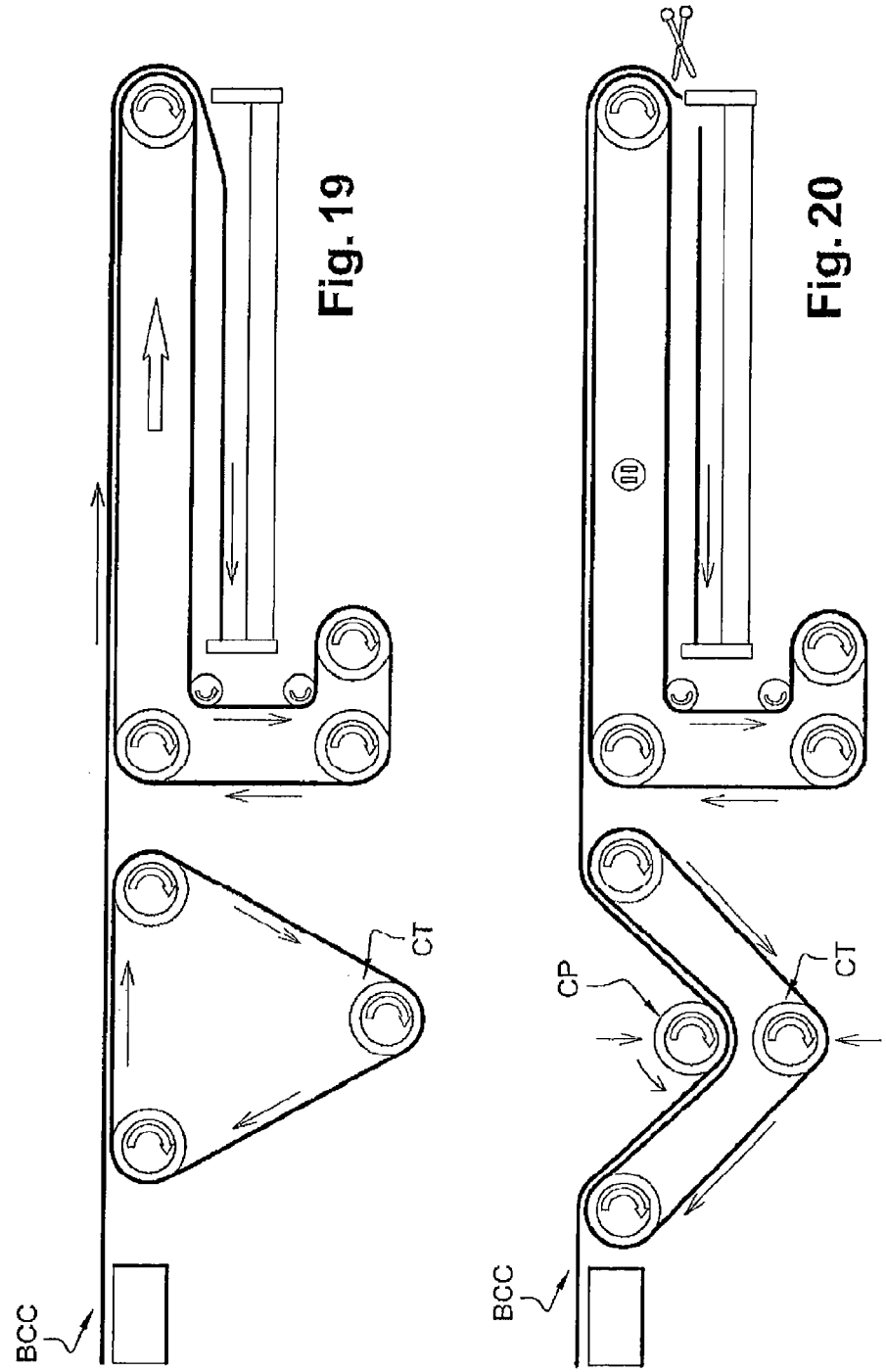

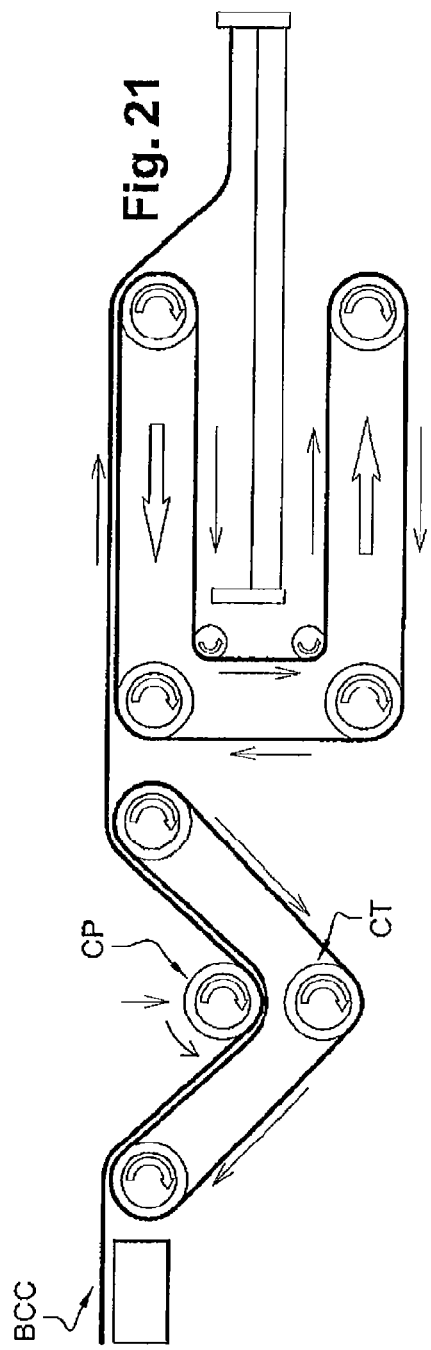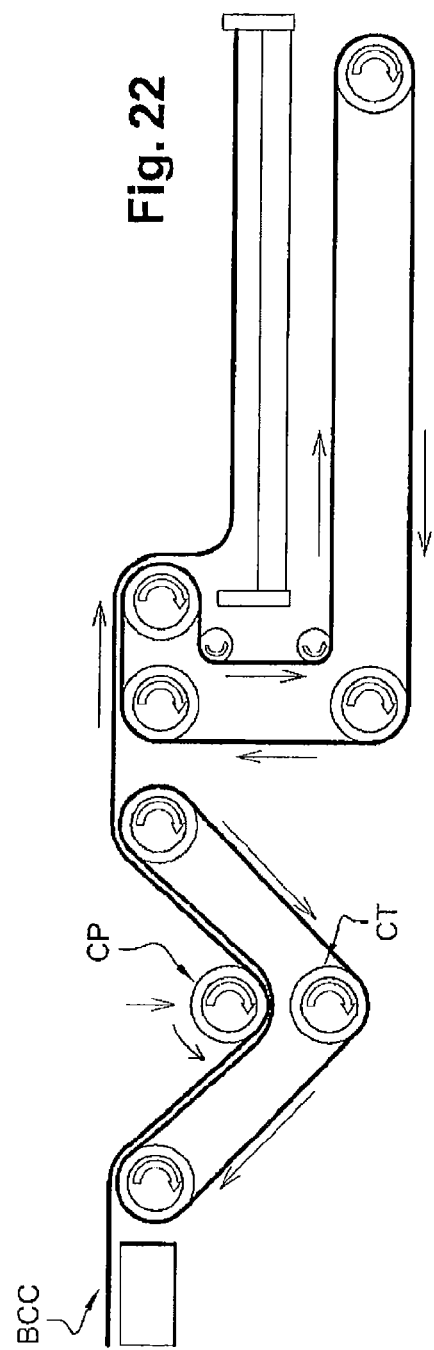

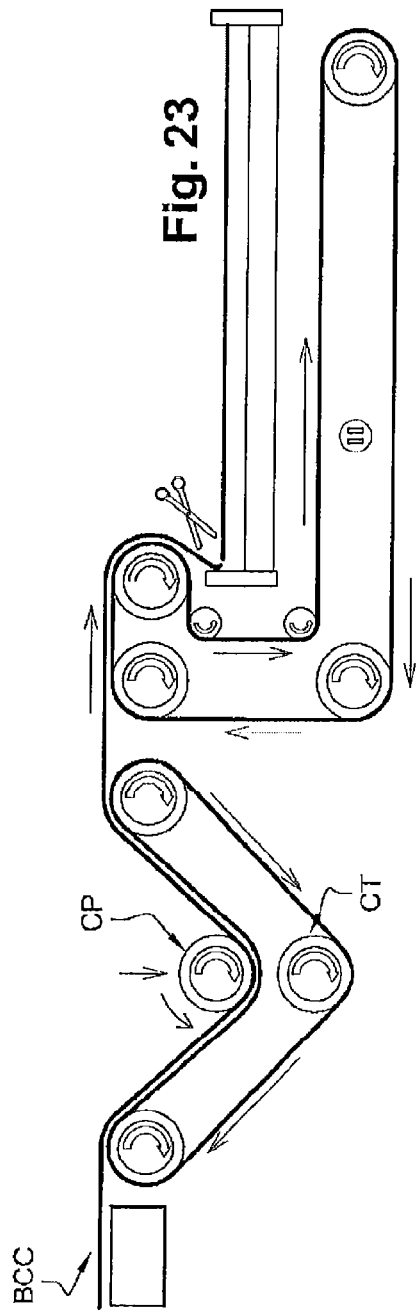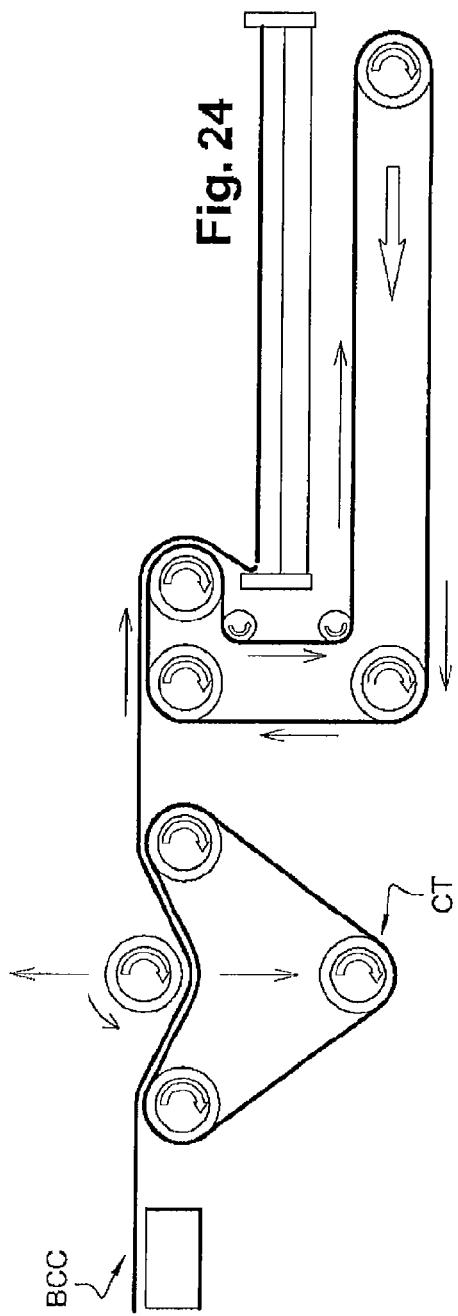

APPARATUS FOR MANUFACTURING A MULTI-AXIAL LAMINATE OF WEBS PRODUCED FROM CABLES BROKEN INTO STRIPS

CROSS REFERENCE TO RELATED APPLICATIONS

This application is a divisional of U.S. application Ser. No. 13/389,638 filed on Apr. 25, 2012, now U.S. Pat. No. 8,636,866, which is a national stage filing under section 371 of International Application No. PCT/FR2010/015645 filed on Aug. 3, 2010, and published in French on Feb. 17, 2011 as WO/2011/018574 and claims priority of French applications No. 0955672 filed on Aug. 14, 2009, and No. 1052148 filed on Mar. 25, 2010, the entire disclosure of these applications being hereby incorporated herein by reference.

BACKGROUND ART

The invention relates to the textile technology of stretch breaking using for example carbon fibres and the use of these fibres in webs in a unidirectional and/or multi-axial orientation.

This technology is well known and finds an application in the manufacture of composite materials based on carbon fibres described in French patent no 2196966.

It consists of stretch breaking in parallel several carbon cables of the ZOLTEK XP 35050 15T-X1, TENAX 24K STS 5611 or SGL 50K C30 T050, EEA sizing, type in a stretch breaker of the SEYDEL 860 type or NSC type TB11 or equivalent. The carbon cables are broken simultaneously and stretched so as to obtain a strip of stretch broken filaments with a width of between 45 mm and more or less 350 mm with a fibre length of 15 to 180 mm. The stretch broken cables must remain contiguous once spread in the form of a strip. In a known manner, the stretch broken carbon fibre cables are arranged on paper supports and then wound in a reel. The latter are then positioned at the feed to a conveyor table in the longitudinal direction after separation from the paper support.

According to the prior art, the continuous yarns or filament cables are deposited on multi-axial weaving machines of the LIBA type. The strips thus formed are juxtaposed and made integral by knitting. The method has major drawbacks relating to the use of yarns, which is an expensive solution, and also because the continuous filaments do not withstand needling well.

To remedy this problem, a solution described in the patent EP 972102 is proposed, which consists of stretch breaking and spreading these cables so as to form strips and then giving each of these strips a cohesion so as to be able to manipulate them. Next, the said strips are wound and then transported to places equipped with multi-axial weaving machines of the LIBA type, the strips being juxtaposed and then made integral by knitting. This solution requires spraying of liquid followed by drying or the addition of chemical bonding agents, or intermediate mechanical operations such as needling for example. It also requires a very high investment in terms of machines in order to provide implementation. The production cost of stretch broken strips is high and consequently limits the applications thereof.

The applicant therefore attempted to dispense with these constraints by purely and simply eliminating the prior cohesion phase of each of the broken strips.

Another aim sought according to the invention by the applicant was to simplify the existing facilities that are expensive in equipment investment and to propose the use of a facility able to offer, from a specific common base, supplementary a la carte arrangements that can meet different requirements according to the user, while remaining within an offer price appreciably less than the costs of the existing facilities.

BRIEF SUMMARY OF INVENTION

According to a first feature, the method of manufacturing the multi-axial laminate from stretch broken strips according to the invention consists of arranging, on a conveyor table, at the feed thereto, a first layer of stretch broken strips, pre-wound and pre-cut, along the longitudinal axis of the table, said strips being partially superimposed, arranging, along the conveyor table, at least two means of transferring and depositing strips, in an oblique and/or divergent position at predetermined angles, each receiving a pre-broken strip, optionally pre-wound and pre-cut, and arranging these strips in successive superimpositions in different planes in order to constitute a multi-axial web of stretch broken strips, said web then being treated by needling, the movement of the support belt of the conveyor table taking place in steps in order to ensure the superimposition of the various layers of pre-broken strips deposited by the said transfer means, the implementation of the method taking place without any prior operation of cohesion treatment of each of the said strips, characterised in that the implementation of the method takes place without any operation of prior cohesion treatment of each of the said strips, and in that a first layer of non-cohesive strips is presented along the longitudinal axis of the table in order to be deposited gradually in the direction of travel of the strip by means of a device for depositing the non-cohesive stretch broken strip, other layers of non-cohesive strips intended to be in successive superimpositions in different planes of the first layer are presented by the same device receiving the said strips and depositing them on transfer means that receive them and translate them in a transverse movement with respect to the table, depositing them gradually as they move as far as the cutting area arranged opposite on either side of the said table, the said strips being deposited by their ends and then unwound as far as the cutting area, and in that the deposition of the said non-cohesive strips is provided by the transfer means, which are arranged so as to enable the continuous and progressive deposition of the strips with a view to constituting the layers, and in that, at the end of travel of the transfer means, the strips are cut by a fixed blocking and cutting device arranged on either side of the table, and then the transfer means are returned and the non-cohesive strips are deposited in order to form another layer.

According to another feature, the said means of transferring and depositing the strips are cross lappers each receiving a pre-broken strip, optionally pre-wound and pre-cut.

According to another feature, the facility for implementing the method of the type comprising a conveyor table having upstream the reception of pre-cracked and pre-wound strips and downstream a needier is remarkable in that it comprises at least two cross lappers positioned at angles defined with respect to the direction of travel of the conveyor table, in opposition, the function of which is to each deposit gradually a stretch broken strip on the conveyor table superimposed in the first case on the first layer of stretch broken strips arranged initially upstream of the conveyor table and in the second case on the two layers already deposited coming from the conveyor table and the first cross lapper, making it possible to obtain a superimposed multilayer and multi-axial web.

According to another feature, the said means of transferring and depositing strips are delivery carriages each receiving a pre-cut stretch broken strip arranged directly without any other intermediate operation, the said strip comprising a carbon strip and a paper support strip, the said delivery carriages being arranged so as to receive means of rewinding the paper strip after separation of the carbon support strip.

These features and yet others will emerge clearly from the remainder of the description.

BRIEF DESCRIPTION OF THE DRAWING FIGURES

To give a clear idea of the subject matter of the invention illustrated non-limitatively in the figures of the drawings, where:

FIG. 13 is a view similar to FIG. 4 to 11 of a cross lapper including a stretch breaker according to FIG. 12.

FIG. 14 illustrates a schematic-type plan view of a third variant embodiment of the method of the invention including in addition to the implementation of FIG. 12, a supplementary regulation device constituting an accumulation conveyor, the stretch breakers operating continuously.

FIGS. 17 to 24 are schematic-type views illustrating the various operating phases of the facility with the cross lapper associated with the regulation device constituting the accumulation conveyor.

Figure 25:
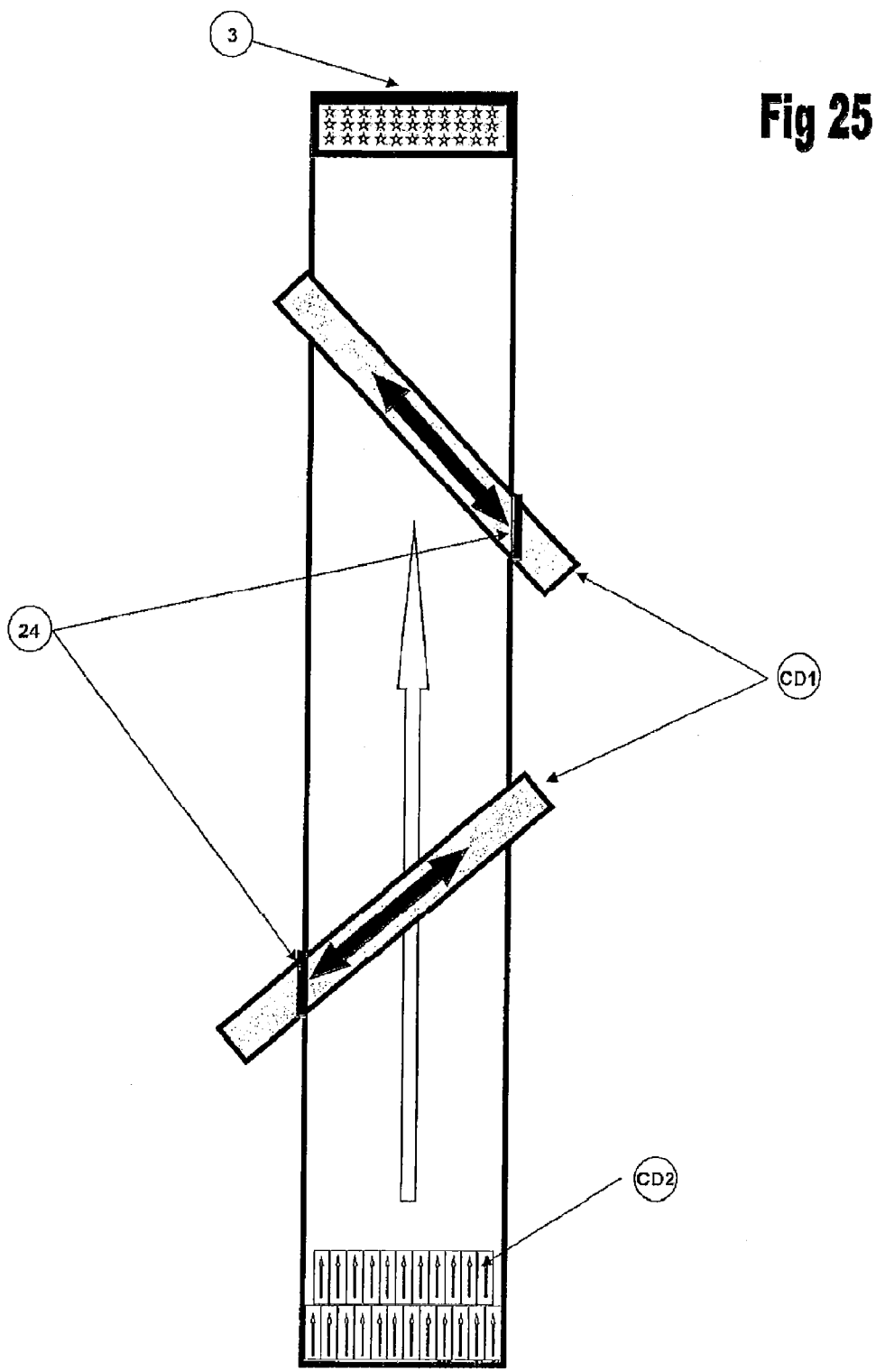

FIG. 25 illustrates a variant embodiment of the facility according to the invention, according to which the means of transferring and depositing pre-broken strips are defined by delivery carriages in substitution for the cross lappers described in the previous figures. These delivery carriages are arranged upstream of the conveyor table and on the sides of the conveyor table in axes oblique to and/or divergent from the direction of travel of the conveyor table.

Figure 26:
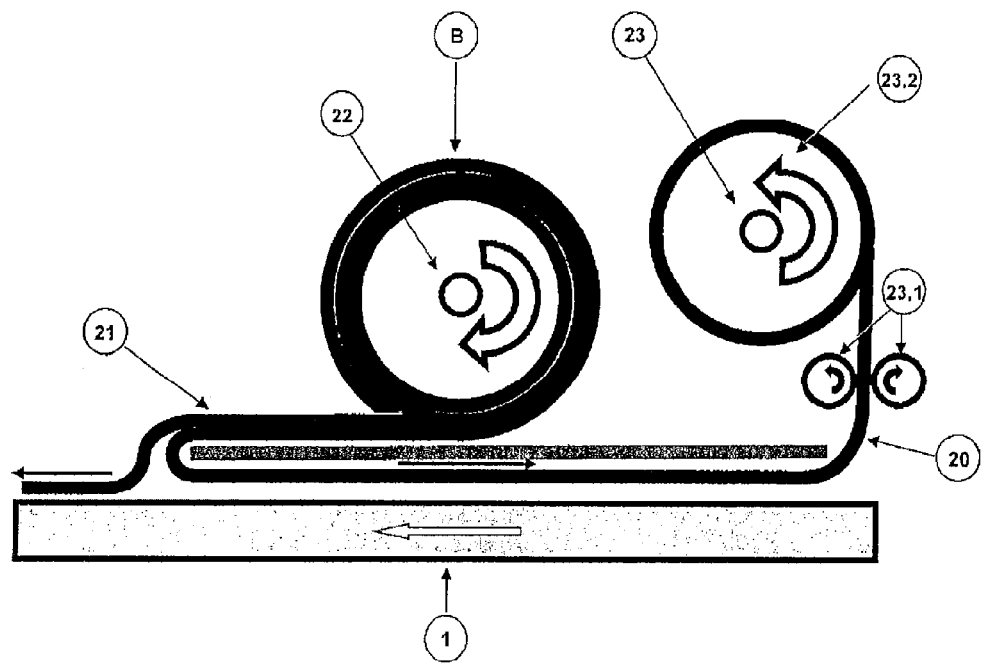

FIG. 26 is a schematic-type view of an individual delivery carriage according to the invention.

Figure 27:
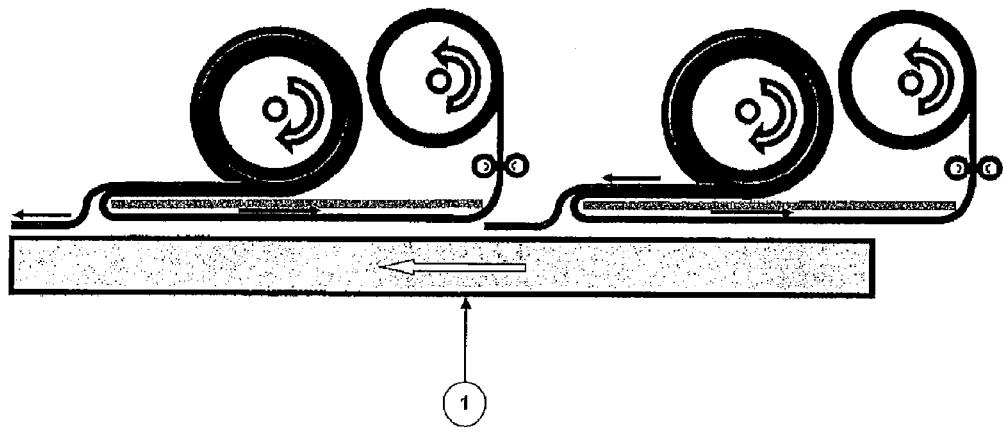

FIG. 27 is a schematic-type view of a multiple delivery carriage according to the invention.

Figure 28:
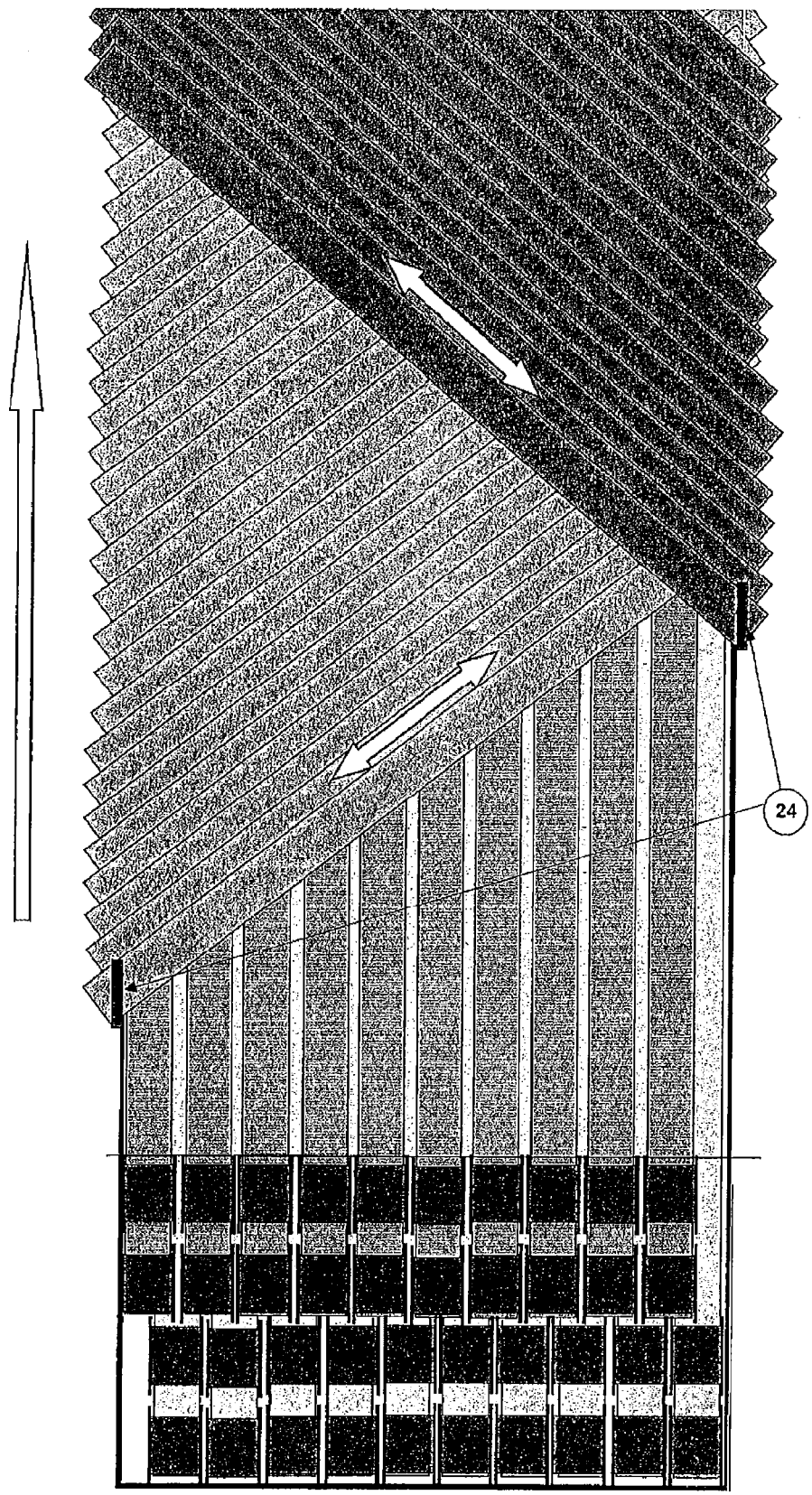

FIG. 28 illustrates schematically the successive deposition of layers of strips on different axes.

FIGS. 29A, 29B, 29C, 29D, 29E, 29F, 29G, 29H illustrate the functioning of a delivery carriage according to the invention.

DETAILED DESCRIPTION

The method of manufacturing the multi-axial laminate produced from stretch broken strips according to the invention consists of arranging on a conveyor table, at the feed thereto, a first layer of pre-broken strips, pre-wound and pre-cut, on the longitudinal axis of the table, said strips being partially superimposed, arranging along the conveyor table at least two transfer and deposition stations in an oblique and/or divergent position at predetermined angles, each receiving a pre-broken, pre-wound and pre-cut strip, arranging them in superimpositions in different planes in order to constitute a multi-axial web of stretch broken strips, the said web then being treated by a needier, the travel of the support belt of the conveyor table taking place in steps in order to ensure the superimposition of the various layers of pre-broken strips deposited by the cross lappers (2C), the implementation of the method taking place without any prior operation of cohesion treatment of each of the said strips.

The stations for transfer and deposition of the pre-broken strips can be implemented either by means of cross lappers or by means of delivery carriages, affording a simplified implementation of the facility. These two variant implementations of the strip transfer and deposition stations will nevertheless be described.

Reference is first of all made to the cross lapper illustrated in FIGS. 1 to 25.

Figure 1:
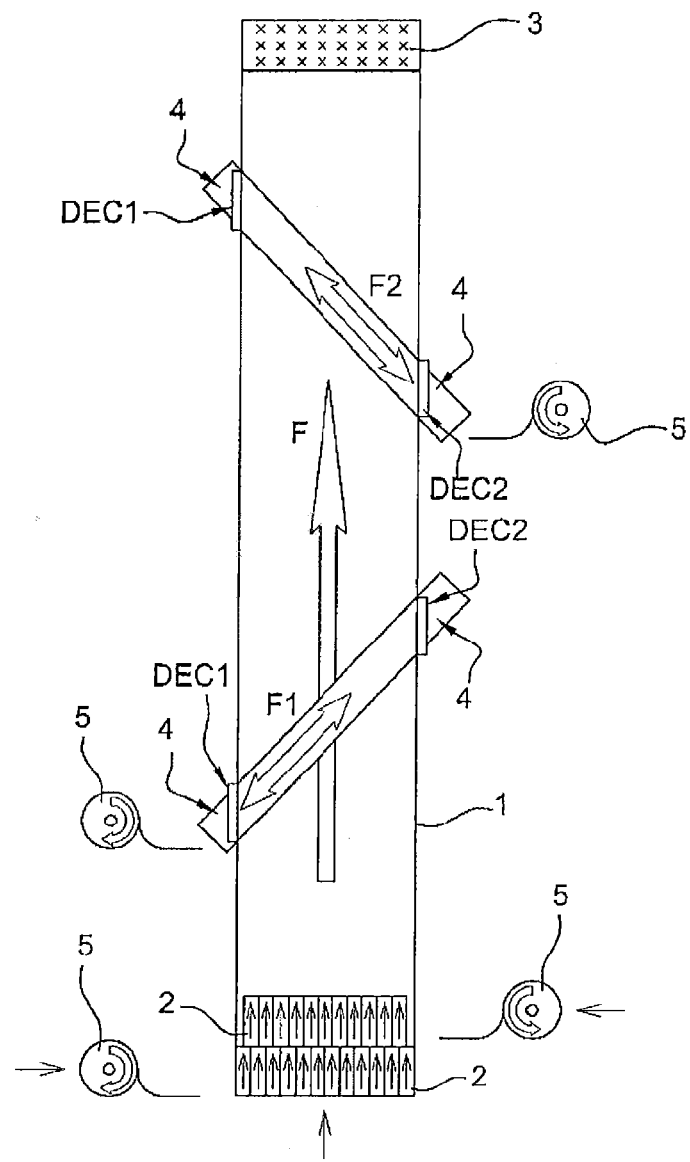
FIG. 1 is a schematic-type plan view of the facility according to a first embodiment and implementation of the method according to the invention.
Figure 2:
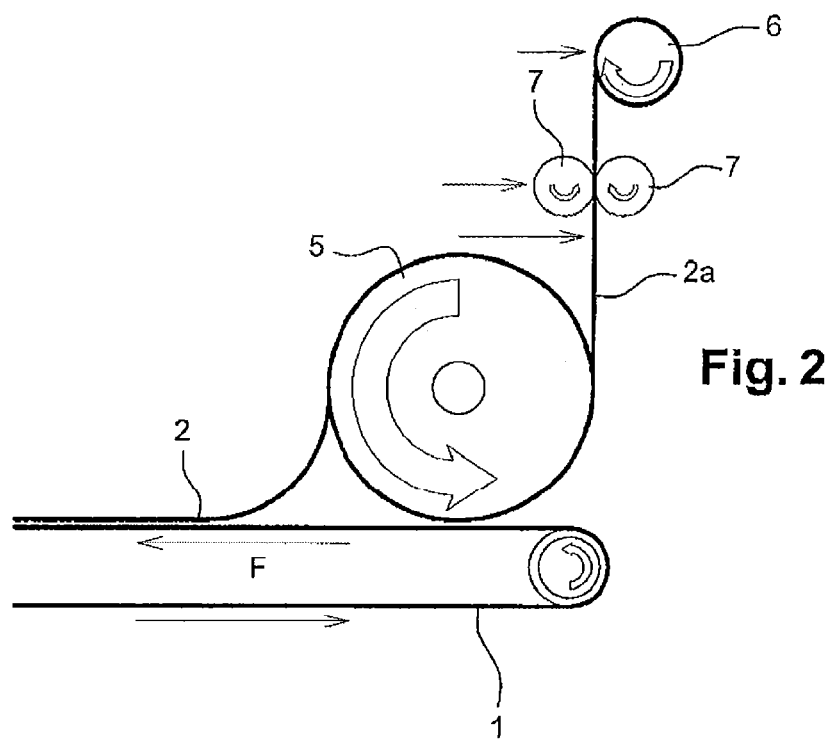
FIG. 2 is a partial view to a large scale illustrating the device for depositing pre-broken and pre-wound strips on the conveyor table.
Figure 2B:
FIG. 2B is a schematic-type view in transverse section illustrating the superimposition of broken strips deposited longitudinally on the conveyor table.
Figure 2C:
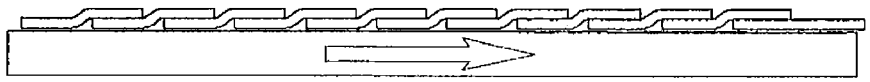
FIG. 2C is a schematic-type view in longitudinal section of the conveyor table illustrating the superimposition of the broken strips as deposited by each of the cross lappers.

Referring to FIG. 1, the conveyor table is referenced (1) and is long, and travels in the direction of the arrow (F). Upstream it is able to receive pre-broken and pre-wound strips (2), also identified as BCC (pre-broken carbon strip), which are arranged in juxtaposition and alignment with partial overlap, preferably half way across, as illustrated in FIG. 2B. Two rows of pre-wound pre-cut strips have thus been shown. It may advantageously be a case of pre-wound pre-cut carbon strips. Downstream of the conveyor table a fixing device (3), such as for example a needier (3), is engaged in a known manner, to provide the finishing of the laminate obtained according to the method of the invention.

The conveyor table has a conventional structure with a belt driven by a suitable drive between two shafts, one driving, the other return.

Figure 2A:
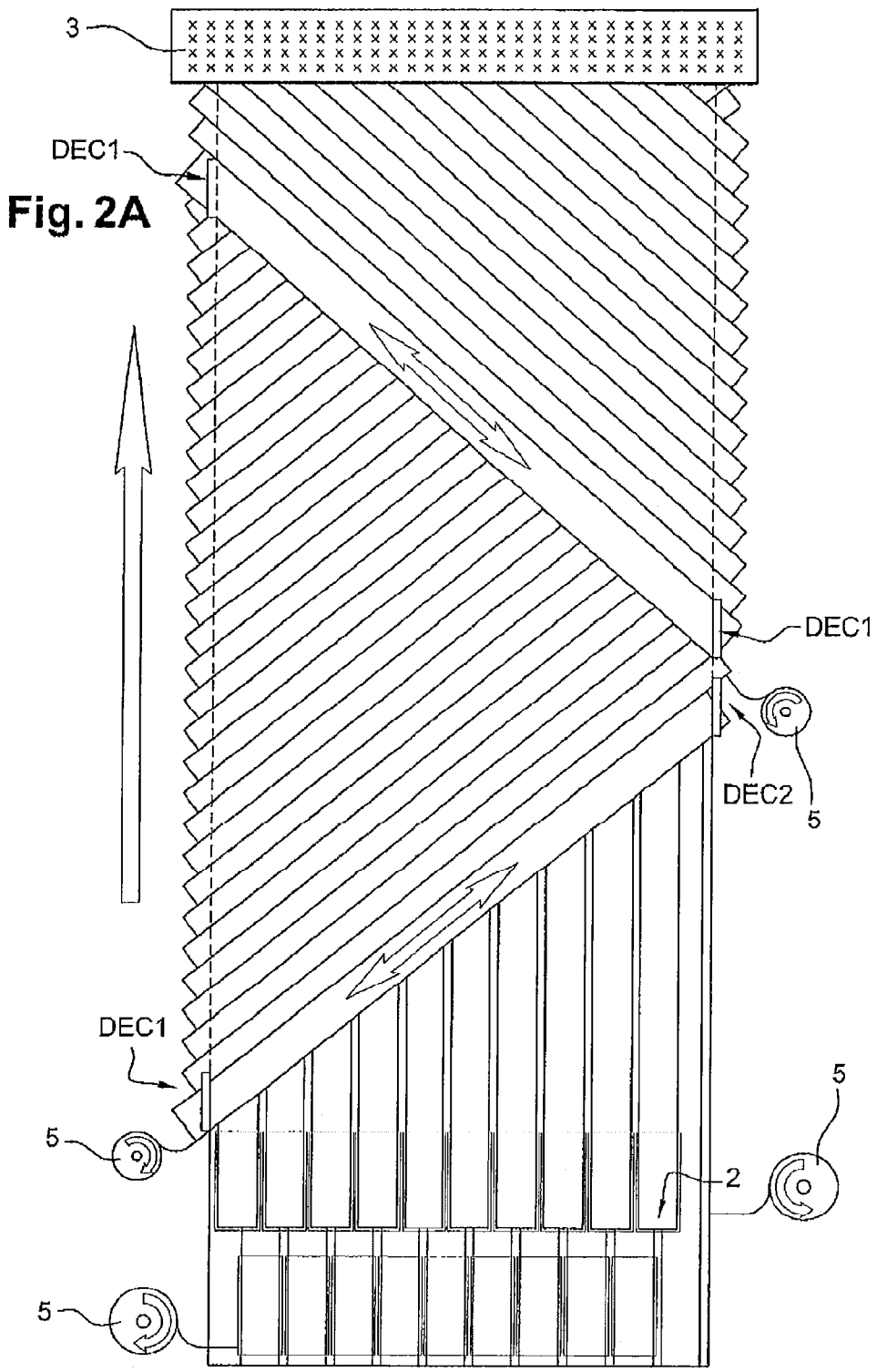
FIG. 2A is a schematic plan view illustrating the successive deposition of layers on different axes.

According to the invention, there is or are preferably arranged along the conveyor table at least two cross lappers (4) positioned at predefined angles, operating in the direction of the arrows (F1-F2), with respect to the direction of travel (F) of the conveyor table, for example at +45° and −45°, in opposition. The function of these cross lappers is to each deposit gradually a stretch broken strip on the conveyor table in superimposition, in the first case on the first layer of stretch broken strips arranged initially upstream of the conveyor table and in the second case on the two layers already deposited coming from the conveyor table and the first cross lapper, the travel of the support belt of the conveyor table taking place in steps in order to provide the superimposition of the different layers of pre-broken strips deposited by the cross lappers (2C). In this way, as shown in FIG. 2A, a multilayer and multi-axial superimposed web is obtained. FIGS. 2 and 2A also illustrate schematically the device for depositing pre-wound pre-cut strips, which are thus situated upstream on the conveyor table and upstream of each cross lapper.

Referring to FIG. 2, the pre-cut strips are initially presented pre-wound in a reel and arranged on a paper support (2a). It is therefore necessary to separate the pre-cut strip from its support. The device (5) is arranged above the conveyor table and the cross lappers and the pre-cut strip is separated from the paper strip, which is routed and then rewound on a reel (6) with, intermediate, a system of cylinders (7) for driving the paper strip. This device has the advantage of providing a constant linear feed speed, whatever the degree of filling of each reel.

Figure 3:
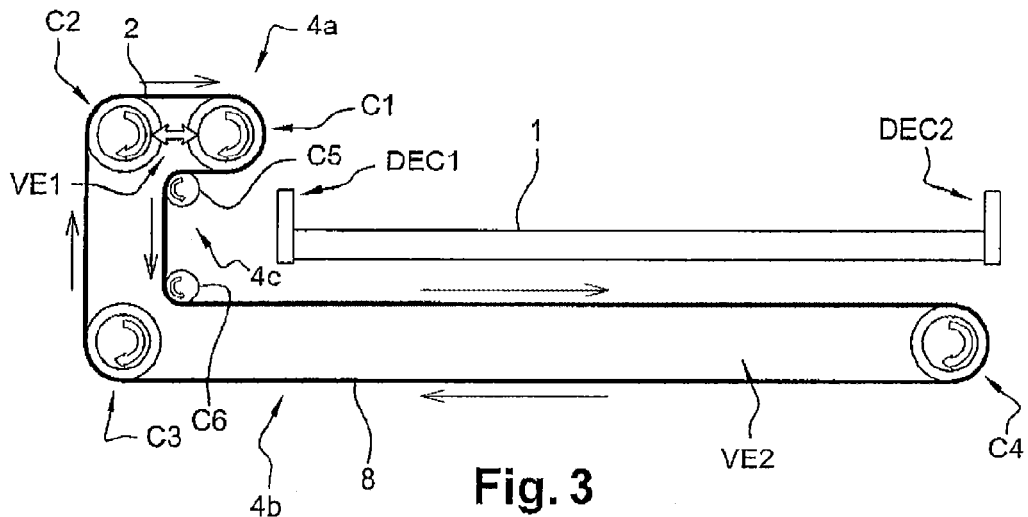
FIG. 3 is a schematic-type view illustrating the operating principle of the cross lapper.

It is consequently necessary to describe the cross lapper (4) illustrated in FIG. 3, used according to the invention.

The cross lapper has a structure liable, according to the operating phases, to be partly (4b) under the conveyor table, or partly (4a) above the conveyor table for depositing pre-cut strips, the two parts being connected together by a lateral side part (4c), the assembly functioning in a discontinuous alternating movement. It also comprises an endless belt (8) that is arranged on guide cylinders C1, C2, C3, C4 and deflection cylinders (C5, C6).

Only the cylinder (C3) is driven and is situated in a lateral position with respect to the conveyor table. The other cylinders (C1, C2, C4) are for free guidance. The cylinders (C1) and (C2) are situated in a plane above the conveyor table, the cylinders (C3, C4) in a plane below. The cylinders (C5, C6) are in a vertical plane of the conveyor table and are in a fixed position. The cylinders (C1) and (C4) are movable, the cylinders (C2) (C3) with a fixed position. The cylinders (C1) and (C4) are able to be translated horizontally by means of jacks (VE1-VE2) or worms and are suitably associated with a pair of cylinders respectively (C1, C2, C3 and C4), either distant from each other or close to each other, depending on the operating phases.

Thus, referring to FIGS. 4 to 11, when the jack (VE1) begins to separate the two top cylinders (C1 and C2), the bottom jack (VE2) contracts with a view to bringing the bottom cylinders together. The amplitude of the movement travel of the said jacks is determined so as to make it possible to deposit the pre-cut strips on the conveyor tables. This cross lapper then layers the stretch broken strip according to the translation of the upper part thereof in an outward and then return direction.

A fixed device for blocking and cutting (DEC1-DEC2) the stretch broken strip at the end of the layering travel is installed, so as to fix it and cut it before beginning the layering in the opposite direction.

This device makes it possible to layer the stretch broken strip, with a suitable linear speed and in both directions of the same axis.

Adjustment of the cross lapper will have to combine the translation speed of the driving cylinders (C1) and (C4) and the rotation speed thereof, the latter determining the speed of travel of the belt of the cross lapper itself.

In addition, at the end of each movement (outward and return) of the cross lapper, the stretch broken strip is blocked and cut. During this operation, the conveyor table is stopped. Next, at the end of the cutting operation, it advances—in steps—by a distance equivalent to the width of the stretch broken strip, or half thereof in the case where a degree of overlap of 50% with respect to the stretch broken strip deposited during the previous translation movement has been parameterised. During these steps, the cross lapper is also paused.

Next, the cross lapper begins its movement in the opposite direction.

It is preferable for the cross lapper (4) to spread the stretch broken strip over a length slightly greater than the diagonal line of the conveyor table, for two reasons:
to avoid creating loops in the stretch broken strip when the direction of the spreading (depositing) is reversed;
to enable the operation of cutting the stretch broken strip.

To give a better understanding of the manufacturing process, reference is made to FIGS. 4 to 11.

Figure 4:
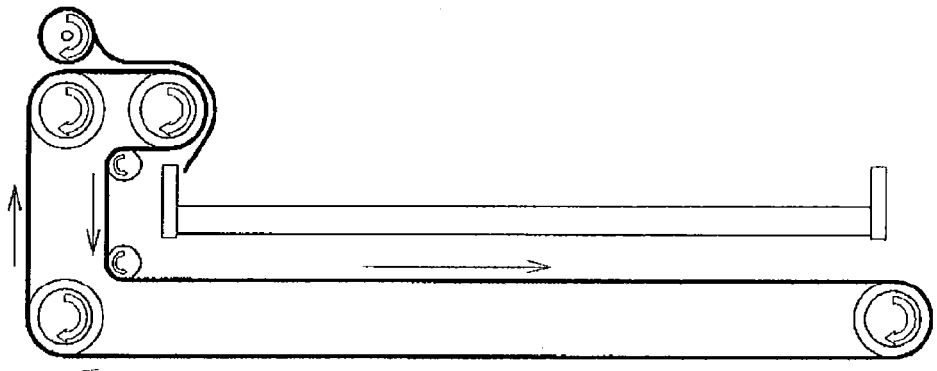
FIGS. 4 to 11 illustrate the various operating phases of the cross lapper in the layering process phase.

In FIG. 4, the cross lapper is pre-supplied with a pre-broken pre-wound carbon strip. It begins its deposition towards the right.

Figure 5:
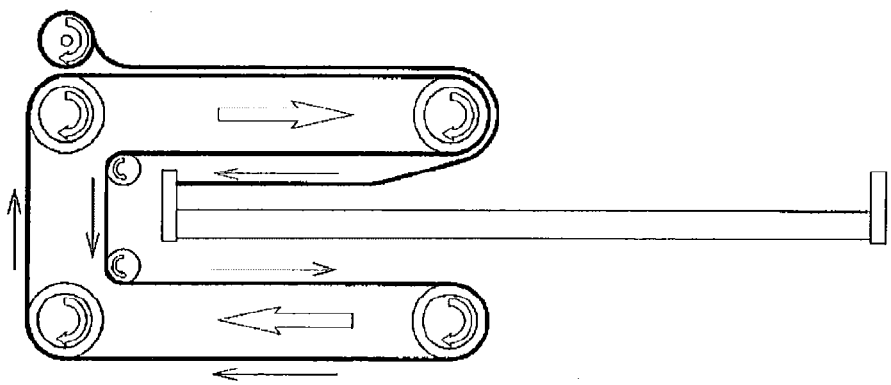

In FIG. 5, the upper jack (VE1) of the cross lapper tensions, so as to enable the stretch broken strip to be deposited towards the opposite side of the conveyor table. Conversely, the lower jack (VE2) contracts.

Figure 6:
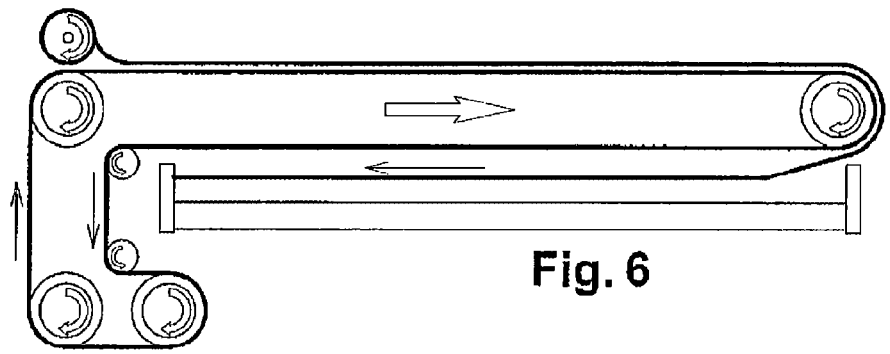

In FIG. 6 the cross lapper ends its deposition of the stretch broken carbon strip.

Figure 7:
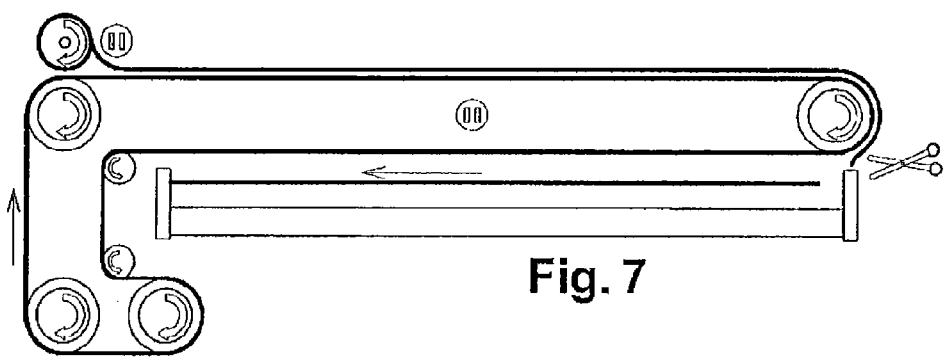

In FIG. 7 the cross lapper stops (pauses) during the operation by the device (DEC2) of cutting the stretch broken carbon strip. Following which, the conveyor table advances by one notch. During these two steps, the pre-broken pre-wound strip ceases to be supplied (pause).

Figure 8:
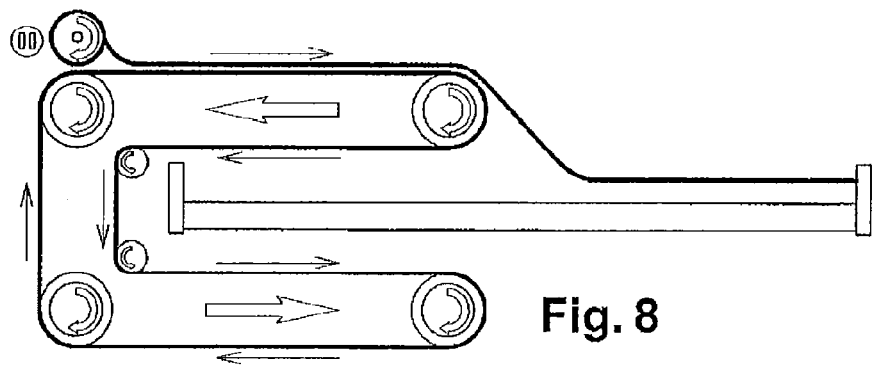

FIG. 8: once the strip has been cut and the table advanced by one notch, the cross lapper begins its return translation movement. The lower jack (VE2) tensions. Conversely, the upper jack (VE1) contracts. The cross lapper at this moment deposits the stretch broken strip that it had accumulated on the outward trip. During this step, the supply of the pre-broken pre-wound strip still remains paused since the cross lapper has accumulated the strip on the outward trip.

Figure 9:
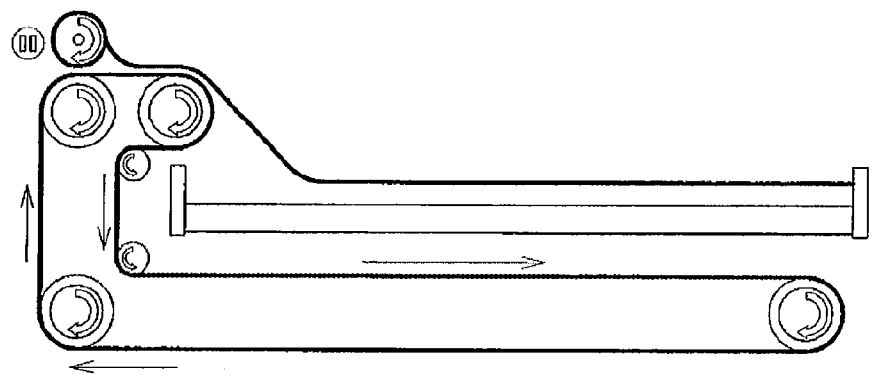

FIG. 9: the cross lapper ends its deposition of the stretch broken carbon strip towards the left (BCC). The supply of the pre-broken strip still remains paused.

Figure 10:
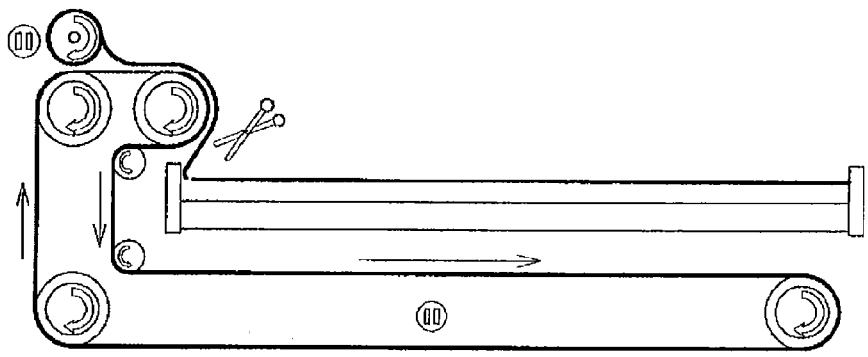

FIG. 10, the cross lapper stops (pauses) during the operation by the device (DEC) of cutting the stretch broken carbon strip. Following which the conveyor table advances by one notch. During these two steps, the supply of the pre-broken strip is still paused.

Figure 11:
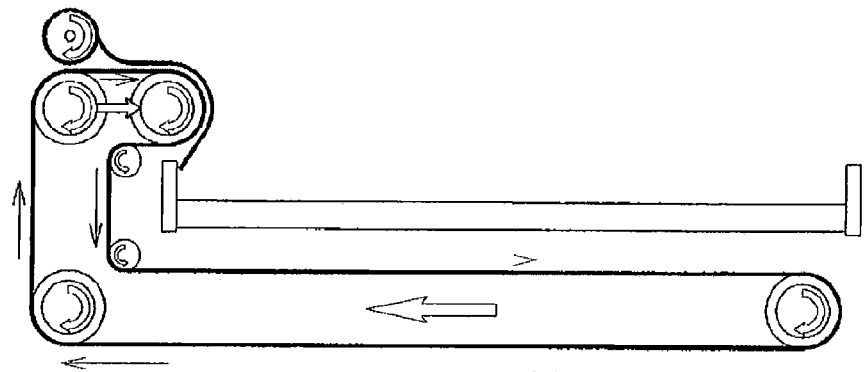

FIG. 11: the cross lapper starts again in translation towards the opposite side of the conveyor table. The upper jack tensions while the lower jack contracts. At this moment, the supply of the pre-broken strip starts to function again, and so on.

At the end of the conveyor table a needier is installed, which will fix the structure formed from three unidirectional stretch broken layers in a multi-axial structure overall. Where applicable a device for fixing by pinching (not illustrated) each side of the conveyor table can be provided so as to block the three-layer structure during the needling operation.

Figure 12:
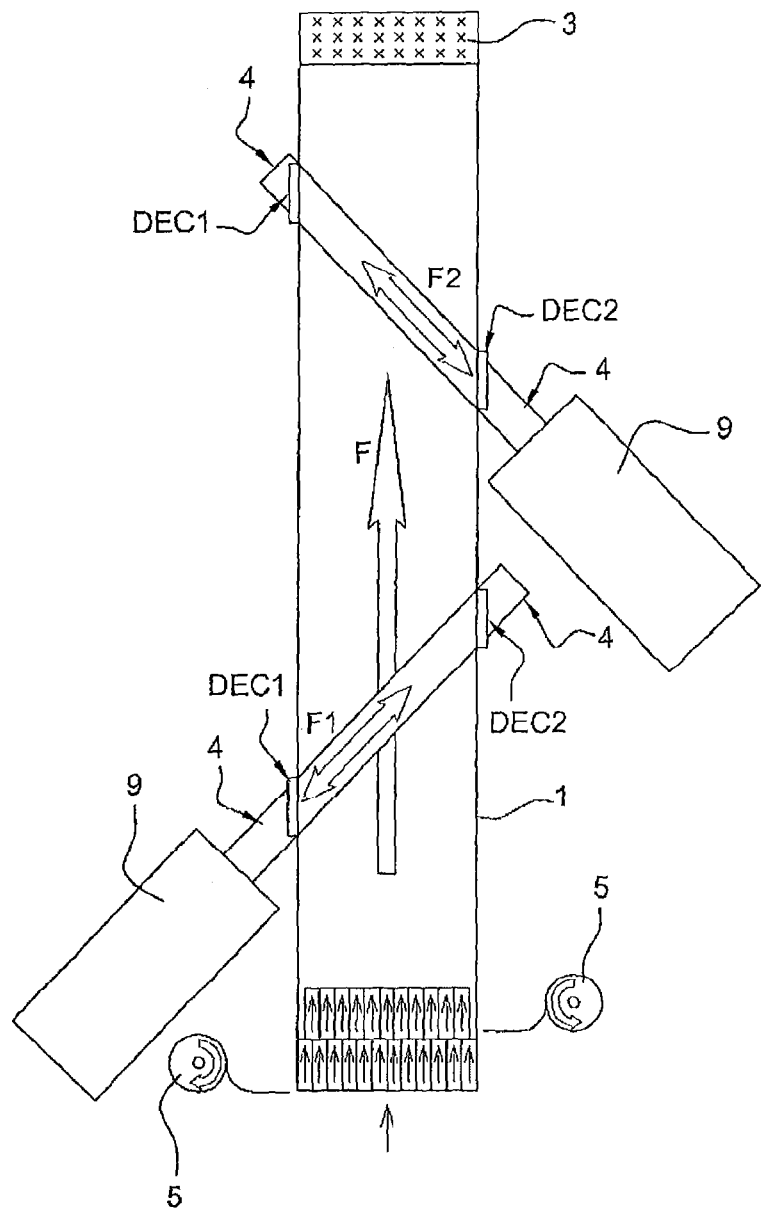
FIG. 12 illustrates a schematic-type plan view of a second variant embodiment of the facility including the automatic supply of the said cross lappers with the supply of stretch broken strips from stretch breakers functioning discontinuously.

The installation as described can be supplemented by the addition to each cross lapper of a stretch breaker (9) arranged upstream and providing an automatic supply to each cross lapper (FIGS. 12 and 13). In this embodiment the stretch breakers (9) work discontinuously in order to supply the cross lappers and simply replace the device (5) for presenting pre-wound stretch broken strips. The concept of the invention in implementing the method remains the same.

The facility as shown in FIGS. 12 and 13 implementing the concept of the invention and including stretch breakers can also be supplemented by the addition of a complementary regulation device (10) constituting an accumulation conveyor as shown in FIGS. 14 to 24. This accumulation conveyor is integrated between each cross lapper (4) and the associated stretch breaker (9) and the purpose thereof is to be able to supply each of the two cross lappers by means of one stretch breaker, this time functioning continuously. Its function is to absorb the continuous production of the stretch breaker during the stoppage time of the cross lapper during phases of cutting the stretch broken strip and during the time of travel of the conveyor table in steps.

The functioning of the accumulation conveyor should be disclosed.

This accumulation conveyor (10) consists of a conveyor belt (10a) guided by fixed rotary cylinders (A1, A2). Only the cylinder (A1) is driven in order to drive the belt, (A2) being free. A third cylinder (CT) is situated below the device, said cylinder also being rotary but having the specificity of being able to rise and fall along a vertical axis so as to tension the conveyor belt (10a) to a greater or lesser extent. Finally, a fourth cylinder referred to as the "pusher cylinder" (CP), also able to move along a vertical axis and situated above the device, has the function of tensioning the conveyor belt to a greater or less extent but in the opposite direction.

Figure 15:
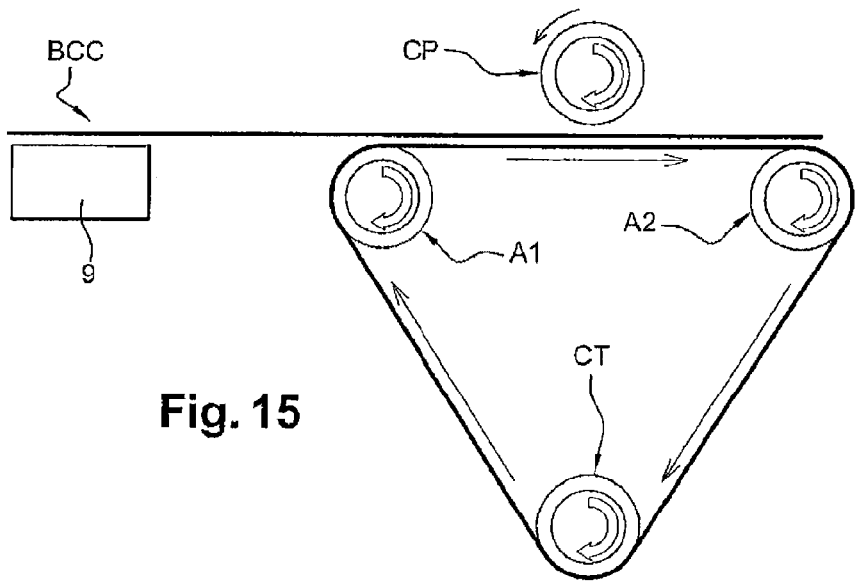
FIGS. 15 and 16 are schematic-type views illustrating the functioning of the accumulation conveyor.
Figure 16:
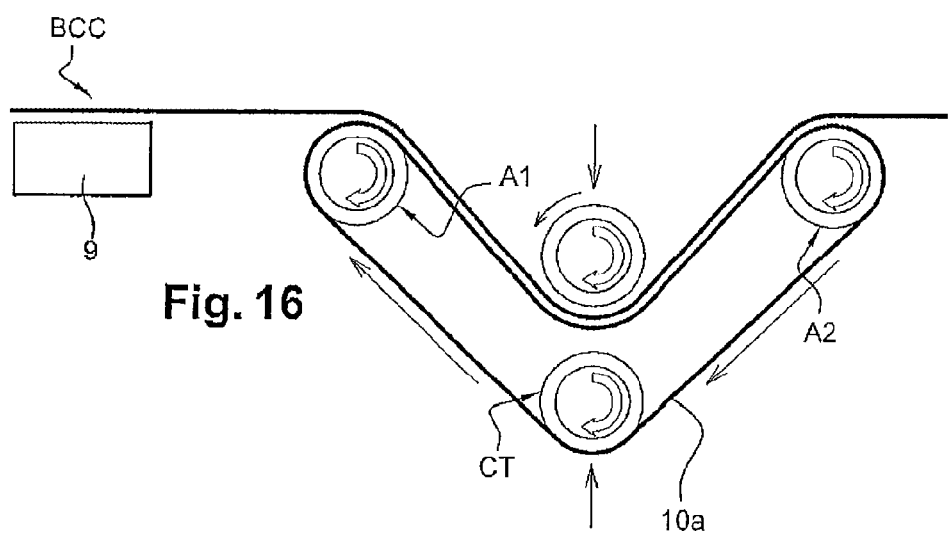

While the cross lapper is being supplied, the accumulation conveyor supplies it at the output speed of the stretch breaker (FIG. 15). The tension cylinder (CT) is then in the low position and the pusher cylinder (CP) in the high position. During stoppages relating to the operations of cutting the stretch broken strip, while the conveyor table is moving forwards, and during the return translation movement of the cross lapper, the accumulation conveyor expands, and the belt length situated between A1 and A2 extends, thus absorbing the continuous production of the stretch breaker. The tension cylinder is then in the high position. Conversely, the pusher cylinder (CP) is in the low position so as to force the belt to extend downwards. The extension of the conveyor belt thus obtained absorbs the excess length manufactured by the stretch breaker during this time.

At the end of the stoppages relating to the operations of cutting the stretch broken strip, during the travel of the conveyor table and during the return translation movement of the cross lapper, the accumulation conveyor progressively retensions and once again re-supplies the cross lapper at the production rate of the stretch breaker.

Naturally, during these stoppages relating to the cutting and travel of the conveyor table, the cross lapper will also stop supplying the layering.

In order to better understand the manufacturing process reference can usefully be made to FIGS. 17 to 24.

FIG. 17: the cross lapper is supplied by the accumulation conveyor at the rate of production of the carbon strip stretch broken by the stretch breaker. It begins its deposition towards the right.

FIG. 18: the upper jack of the cross lapper tensions, so as to enable the stretch broken strip to be deposited towards the opposite side of the conveyor table. Conversely, the lower jack contracts.

FIG. 19: the cross lapper ends its deposition of the stretch broken carbon strip.

FIG. 20: the cross lapper stops (pauses) during the operation of cutting the stretch broken carbon strip. During this time, the accumulation conveyor extends, thus making it possible to accumulate the still continuous production of the stretch breaker. Following which, the conveyor table advances by one notch. During this time, the accumulation conveyor continues to expand, thus making it possible to continue to accumulate the still continuous production of the stretch breaker.

FIG. 21: once the strip has been cut and the table has advanced by one notch, the cross lapper begins its return translation movement. The upper jack contracts while the lower jack tensions. The cross lapper at this moment deposits a stretch broken strip that it had accumulated on the outward trip. It therefore still does not during this time absorb the production of the stretch breaker. Thus, in order to absorb the accumulated production of the stretch broken carbon strip during this step, the accumulation conveyor continues to expand.

FIG. 22: the cross lapper ends its deposition of the stretch broken carbon strip towards the left (BBC).

FIG. 23: the cross lapper stops (pauses) during the operation of cutting the stretch broken carbon strip (BCC). During this time, the accumulation conveyor continues to expand, thus making it possible to accumulate the still continuous production of the stretch breaker. Following which, the conveyor table advances by one notch. During this time, the accumulation conveyor continues to expand, thus making it possible to continue to accumulate the still continuous production of the stretch breaker.

FIG. 24: the cross lapper starts again in translation towards the opposite side of the conveyor table. The upper jack tensions while the lower jack contracts. At this moment, the pusher cylinder (CP) of the accumulation conveyor progressively rises again while the tension cylinder (CT) falls again so as to progressively re-tension the conveyor belt and progressively redeliver the length of stretch broken strip accumulated during the previous steps.

The needier described previously is situated at the end of the conveyor table.

Reference is now made to the second variant embodiment of the stations transferring and depositing the stretch broken strips, shown in FIGS. 25 to 29-5.

In this embodiment, the facility uses delivery carriages (CD) of two types, firstly single CD1 and secondly multiple CD2, which are arranged with respect to the conveyor table (1) respectively on the sides of the table in the oblique and/or divergent position and secondly upstream of the table to enable the stretch broken strips to be deposited on the conveyor table. The delivery carriages receive the reels B of pre-broken pre-wound strips with the insertion of a wound paper strip (20) between each carbon strip turn (21) in order to provide protection thereof. The delivery carriages can be arranged in an offset position and in opposition as presented in FIG. 25. They can also be arranged from a common point on the same side, separating in an oblique and/or divergent orientation.

In this embodiment, the single or multiple delivery carriages are arranged so as to comprise in combination a first cylinder (22) rotating in a direction receiving the pre-broken pre-wound strips, and a device (23) for discharging and re-winding the paper strip (20). More particularly, this device (23) is integrated in the delivery carriage behind the first cylinder (22). The device (23) comprises two driven spindles (23-1) rotating in opposition, between which the paper strips pass in order to draw it onto a recovery cylinder (23-2), rotating in opposition with respect to the first cylinder. The said driven spindles absorb the paper strip at a constant linear speed. The two cylinders and the aforementioned spindles are arranged in a fixed position with respect to the delivery carriage CD1 CD2. FIGS. 26 and 27 show respectively a single delivery carriage and a multiple delivery carriage. They comprise the same arrangement of a first cylinder (22) winding the pre-broken strip and the associated device (23) for discharging the paper strip, but in the case of multiple delivery carriages these are arranged in parallel and slightly offset in order to enable strips to be distributed and unwound on the conveyor table as the latter advances, and in a configuration of presentation of the strips in partial superimposition as indicated previously. The multiple delivery carriages CD2 as shown in FIG. 25 are arranged upstream of the conveyor table (1) in order to load carbon strips (21) after separation of the paper strip (20). Thus FIG. 25 shows the positioning of multiple delivery carriages, which are in the particular case illustrated two in number.

The individual delivery carriages CD1 are arranged so as each to deliver a single carbon strip (21) and are positioned as before in the first embodiment at angles predefined with respect to the direction of travel of the conveyor table. These angular positionings are for example and non-limitatively at 45° with respect to the longitudinal axis of the conveyor table. The function of these individual delivery carriages is to gradually deposit a stretch broken strip on the conveyor table unidirectionally.

FIG. 25 also shows in a similar manner to FIG. 1 a fixing device (3) placed at the end of the conveyor table in order to provide cohesion of all the layers consisting of the multi-axial strips thus formed. This fixing device may as an example but not exhaustively be a needier, a pre-needier, a water jet fixing device, a knitting machine or a device for spraying a chemical bonding means or the like.

It is therefore necessary to disclose the implementation of the multi-axial web laminate method with the implementation of this variant embodiment. Upstream of the conveyor table, in the longitudinal direction thereof, as many stretch broken pre-wound strips as necessary to fill the table are arranged. These stretch broken pre-wound strips were made up previously and reeled and thus comprise the carbon strip and the paper strip arranged between each turn so as to protect the carbon strip. Several multiple carriages are thus arranged in parallel, affording a parameterisable overlap of the strips with each other, generally fixed at 50%. Starting the conveyor table causes the reels to unwind and the carbon strips to be simultaneously deposited, while the paper strip coming from said reel is recovered and wound by means of the device arranged on each delivery carriage.

At the same time, the individual delivery carriages will be started up for delivery of carbon strips according to the angulation chosen with respect to the direction of movement of the conveyor table. As provided in the first embodiment, in relation to each of the individual delivery carriages a device (24) is provided for blocking and cutting the carbon strip at the end of deposition travel before the operation of backward travel of the corresponding delivery carriage.

Referring to FIGS. 29A to 29H, the functioning and movement of an individual delivery carriage is explained.

Figure 29A:
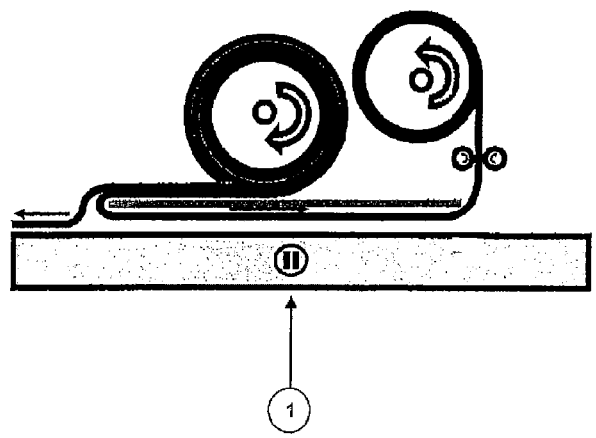
Figure 29B:
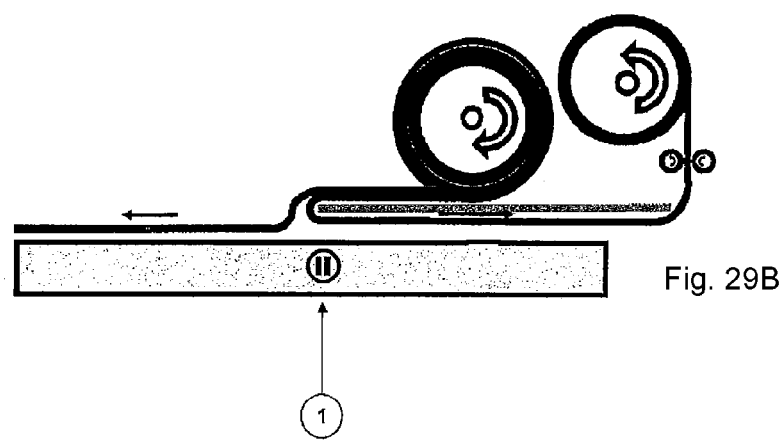

In FIG. 29A, the individual delivery carriage CD-1, which comprises a pre-broken strip reel, implements, through the functioning of the cylinder and of the paper strip recovery device, the deposition of the carbon strip (21) with respect to the conveyor table, by beginning its translation to the right, as shown in FIG. 29B. The driven spindles of the device for recovering the paper strip provide the traction and removal of the paper strip (20), which is discharged onto the recovery cylinder (23-2).

Figure 29C:
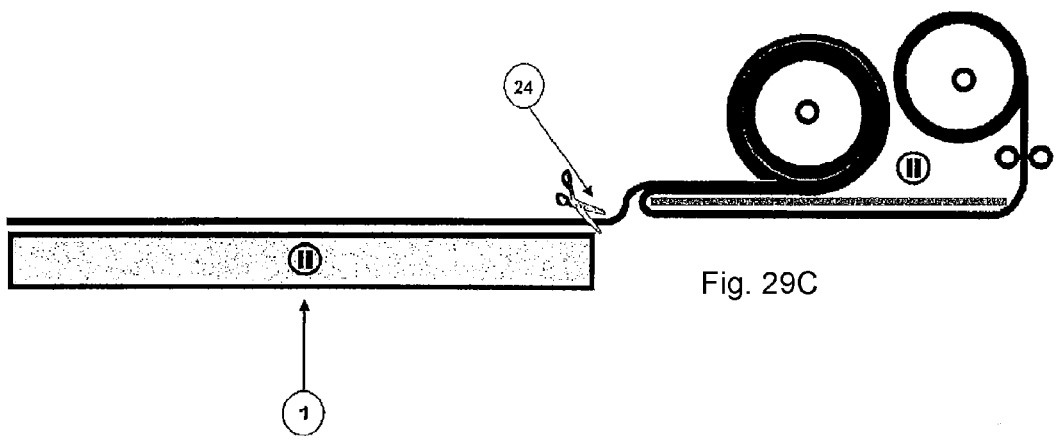

In the following phase, shown in FIG. 29C, the individual delivery carriage has ended its translation on the other side of the conveyor table towards the right as shown in this figure. In this situation, the driven spindles for absorbing the paper strip (23-1) are deactivated, which also causes the stoppage of the recovery cylinder (23-2). The depositing of the carbon strip is also stopped and it is then possible to proceed, with the cutting device (24), with the cutting of the stretch broken strip arranged on the first cylinder. There is therefore a separation with the carbon strip that has just been deposited on the conveyor table.

During these three phases, it should be noted that the conveyor table has remained immobile.

Figure 29D:
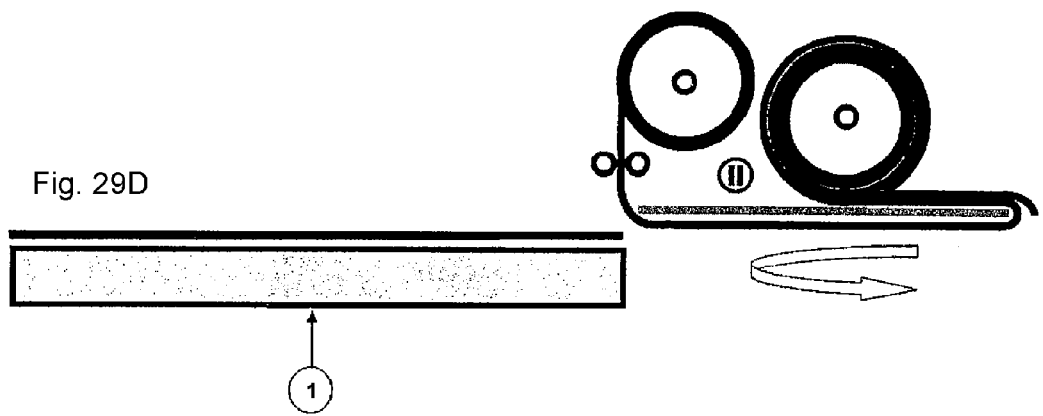

Next, as shown in FIG. 29D, the individual delivery carriage is arranged on a support allowing rotation of said delivery carriage on itself through 180° by means of rotation means of a type known commercially, and actuated after each passage on either side of the conveyor table.

During this movement, the conveyor table advances by one step, and then stops once again.

Figure 29E:
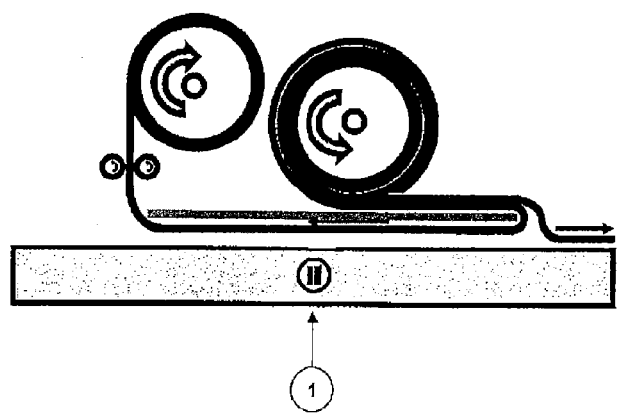
Figure 29F:
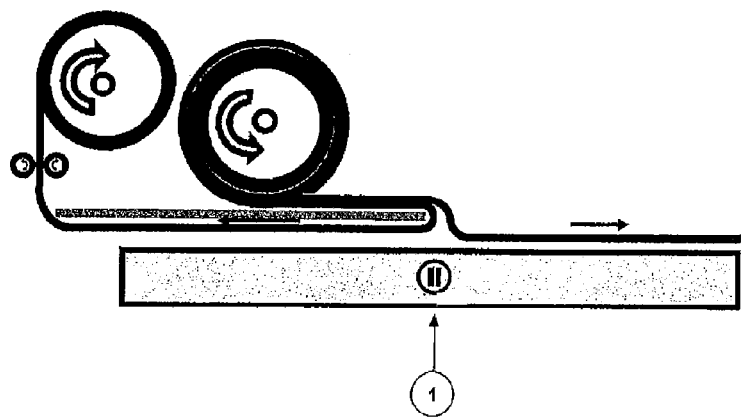

In FIG. 29E, the individual delivery carriage CD1 begins its translation towards the left, as shown in FIG. 29F. The driven spindles of the device recovering the paper strip (23-1) start to move again, providing the traction and removal of the paper strip (20) which is discharged onto the recovery cylinder (23-2).

Figure 29G:
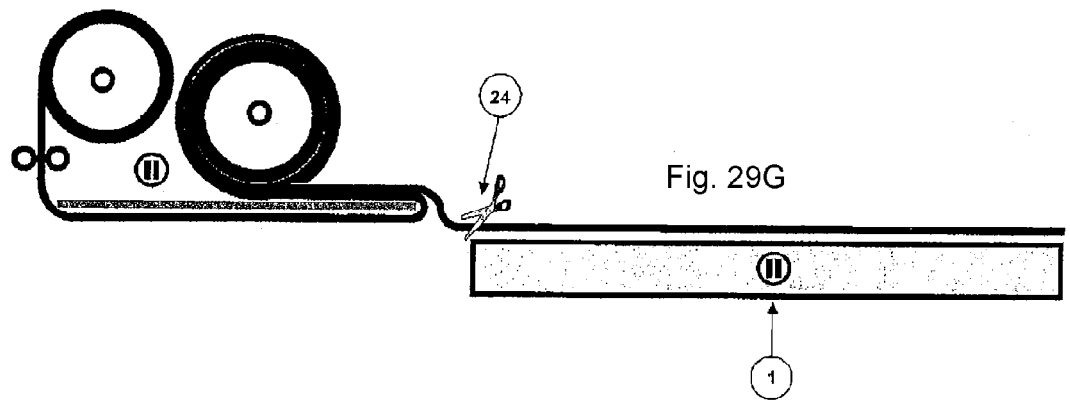

In the following phase, shown in FIG. 29G, the individual delivery carriage has ended its translation on the other side of the conveyor table, towards the left, as shown in this figure. In this situation, the driven spindles for absorbing the paper strip (23-1) are deactivated, which also causes the stoppage of the recovery cylinder (23-2). The deposition of the carbon strip is also stopped and it is then possible to proceed, with the cutting device (24), with the cutting of the stretch broken strip arranged on the first cylinder.

There is therefore a separation with the carbon strip that has just been deposited on the conveyor table.

During these three phases, it should be noted that the conveyor table has remained immobile (pause).

Figure 29H:
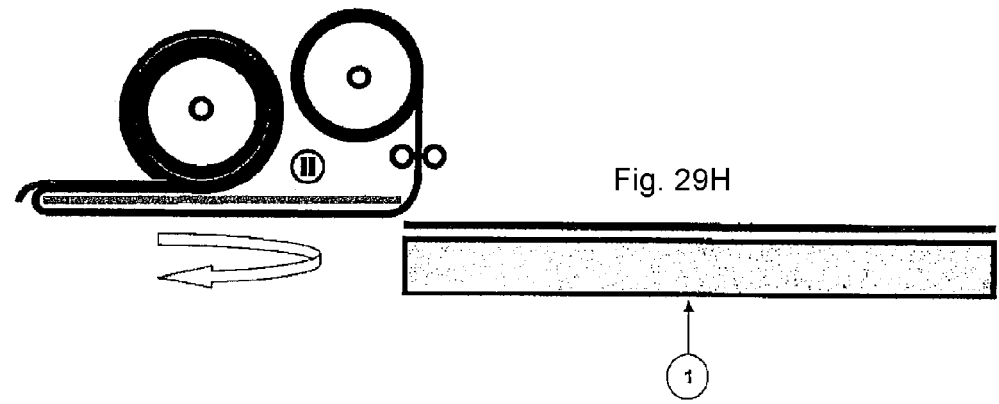

Next, as shown in FIG. 29H, the individual delivery carriage makes a rotation on itself of 180°.

During this movement, the conveyor table advances by one step, and then stops once again.

Next, the delivery carriage begins once again a translation towards the right, and so on.

The device for turning the delivery carriage at the end of each translation movement optimises the productivity of the line by enabling the strip to be deposited in each direction.

This second variant embodiment as described and illustrated in the drawings is of a simpler design and less expensive and finds applications and uses according to the requirements sought. The movement of the individual delivery carriages with respect to the conveyor table takes place by any suitable means.

The advantages emerge clearly from the invention. The method can allow the production of a multi-axial laminate of webs produced from stretch broken strips, under mechanical conditions adaptable according to requirements, without needing to proceed with a prior operation of cohesion of each of the strips used, and with a less expensive investment in equipment.

The invention claimed is:

1. An apparatus for manufacturing a multi-axial laminate of webs from strips of stretch broken fibers comprising:
   a conveyor table which moves in a longitudinal direction, the conveyor table having an upstream end, a downstream end and two longitudinal sides;
   a plurality of multiple delivery carriages located at an upstream section of the conveyor table, wherein each multiple delivery carriage is configured to hold two reels of pre-broken and pre-wound carbon strips having a paper strip backing and to deposit the strips on the conveyor table to form a first layer of carbon strips;
   a first single delivery carriage located downstream of the multiple delivery carriages, wherein the first single delivery carriage is configured to hold at least a single reel of pre-broken and pre-wound carbon strip having a paper strip backing and to deposit the strip on the first layer to form a second layer of carbon strips, and wherein the first single delivery carriage is arranged on one of the longitudinal sides of the conveyor table at a predetermined angle with respect to the longitudinal direction;

a second single delivery carriage located downstream of the first single delivery carriage, wherein the second single delivery carriage is configured to hold a single reel of pre-broken and pre-wound carbon strip having a paper strip backing and to deposit the strip on the second layer to form a third layer of carbon strips, and wherein the second single delivery carriage is arranged on one of the longitudinal sides of the conveyor table at a predetermined angle with respect to the longitudinal direction; and a fixing device downstream of the second single delivery carriage which fixes the first, second and third layers together to form the multi-axial laminate.

2. The apparatus according to claim 1, wherein at least one of the single and multiple delivery carriages further includes a device for rewinding the paper strip backing from a corresponding reel as the carbon strip is deposited.

3. The apparatus according to claim 2, wherein the device comprises two driven spindles rotating in opposite directions, between which the paper strip backing passes, and a recovery cylinder, rotating in an opposite direction to the corresponding reel, and said driven spindles move the paper strip backing at a constant linear speed.

4. The apparatus according to claim 2, further including rotation means for rotating the first single delivery carriage and the second single delivery carriage through 180°.

5. The apparatus according to claim 1, wherein the multiple delivery carriages are arranged in parallel and slightly offset to distribute on the conveyor table as the table advances, the carbon strips in partial superimposition.

* * * * *